(12) United States Patent
Oliveira et al.

(10) Patent No.: US 8,036,358 B2
(45) Date of Patent: Oct. 11, 2011

(54) DISTRIBUTED VOICE CONFERENCING

(75) Inventors: Marcelo Gomes Oliveira, San Jose, CA (US); Kiran Hassan, Santa Clara, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1834 days.

(21) Appl. No.: 10/796,735

(22) Filed: Mar. 9, 2004

(65) Prior Publication Data

US 2005/0201303 A1    Sep. 15, 2005

(51) Int. Cl.
*H04M 3/56*    (2006.01)
*H04L 12/18*    (2006.01)

(52) U.S. Cl. .................. 379/202.01; 370/260; 370/265; 370/266

(58) Field of Classification Search .................. 370/260, 370/261–269; 379/202.01–206.01
See application file for complete search history.

(56) References Cited

U.S. PATENT DOCUMENTS

| | | | | |
|---|---|---|---|---|
| 6,125,343 | A * | 9/2000 | Schuster | 704/201 |
| 6,442,758 | B1 | 8/2002 | Jang et al. | |
| 6,675,286 | B1 * | 1/2004 | Sun et al. | 712/215 |
| 2003/0026214 | A1 * | 2/2003 | Iveland et al. | 370/260 |
| 2003/0206549 | A1 * | 11/2003 | Mody et al. | 370/390 |
| 2004/0002448 | A1 * | 1/2004 | Tsantrizos et al. | 514/9 |
| 2004/0186904 | A1 | 9/2004 | Oliveira | |
| 2004/0190701 | A1 * | 9/2004 | Biage | 379/202.01 |
| 2004/0234058 | A1 * | 11/2004 | Darby et al. | 379/202.01 |
| 2004/0264441 | A1 * | 12/2004 | Jalkanen et al. | 370/352 |
| 2004/0267882 | A1 * | 12/2004 | Whynot et al. | 709/204 |
| 2004/0268150 | A1 * | 12/2004 | Aaron | 713/201 |
| 2005/0021619 | A1 | 1/2005 | Oliveira | |
| 2007/0165651 | A1 * | 7/2007 | Sukegawa et al. | 370/401 |

FOREIGN PATENT DOCUMENTS

| | | |
|---|---|---|
| EP | 0 805 582 A2 | 11/1997 |
| EP | 0 959 585 A2 | 11/1999 |
| EP | 1 091 550 A2 | 4/2001 |

OTHER PUBLICATIONS

Kinoshita, H.; Caricatto, L.H.; Diaz, V.A.V.; Telecommunications Symposium, 1990. ITS '90 Symposium Record., SBT/IEEE International Sep. 3-6, 1990, pp. 143-149.*
Douglas Corner, *Internetworking with TCP/IP*, Chapter 4 (1995).
Douglas Corner, *Internetworking with TCP/IP*, Chapter 12 (1995).
Douglas Corner, *Internetworking with TCP/IP*, Chapter 17 (1995).

* cited by examiner

*Primary Examiner* — Harry Hong (57) ABSTRACT

A voice conferencing system assigns voice conferences across multiple media processors. The voice conferencing system may thereby allow voice conferences to proceed, even when any single media processor in the conferencing system does not have the resources needed to handle the voice conference. The voice conferencing system may enhance communication capabilities, without significantly increasing cost or equipment requirements.

30 Claims, 5 Drawing Sheets

DISTRIBUTED VOICE CONFERENCING

FIELD OF THE INVENTION

The present invention relates to voice conferencing. In particular, the present invention relates to expanding a conference over multiple media processors to efficiently extend the conferencing capabilities of a voice conferencing system.

BACKGROUND OF THE INVENTION

Effective communication is critical for successful business. The desire to enhance communication, in conjunction with incredible advances in processing technology, have lead to new and effective communication systems for businesses. For example, traditional data-only networks have now merged with traditional voice-only networks to form sophisticated hybrid Internet Protocol (IP) Telephone systems. The cost and performance benefits associated with IP Telephone systems has lead to their successful implementation in hundreds of companies.

One popular service now offered over IP Telephony systems is the voice conference. In a voice conference, multiple participants engage in discussions through the support of the IP Telephone backbone. The participants may be located virtually anywhere, with the backbone seamlessly connecting the participants as if they were in the same conference room.

In the past, the IP Telephony system assigned a single media processor to each voice conference. The assigned media processor handled the entire data flow generated by all participants in the voice conference. However, because the media processor had limited computational capabilities and memory resources, the media processor could only process a limited number of voice channels. Thus, additional individuals simply could not participate in a voice conference when the media processor channel limits had been reached.

Depending on the resources available to the media processor, and the number of conference participants, a single media processor sometimes handled multiple independent, relatively small voice conferences. For example, a single media processor might divide its total voice channel processing capability between three small, but independent, voice conferences. However, such configurations led to yet another difficulty, namely resource fragmentation.

Whenever a media processor hosted one or more voice conferences, each voice conference consumed a certain number of voice channel resources. As a result, a request for a new voice conference with more participants than available voice channel resources had to be refused. For example, a media processor supporting 20 voice channels, currently hosting a marketing voice conference with 10 channels and a design voice conference with 5 channels, could not support a sales voice conference requiring 6 or more channels. The remaining 5 voice channels were fragmented away from the original 20 voice channels, and were effectively an unavailable resource for the media processor.

In order to expand capacity, multiple media processors were sometimes provided, with each media processor again handling the entirety of one or more voice conferences. However, even when multiple media processors were present, the IP Telephony system assigned voice conferences to the media processors in the same way. Consequently, rather than generating resource fragmentation on a single media processor, the IP Telephone system generated resource fragmentation on multiple media processors.

SUMMARY

A conferencing system assigns voice conferences across multiple media processors. The conferencing system thereby allows voice conferences to proceed, even when any single media processor in the conferencing system could not support the voice conference. The conferencing system pools the voice channel resources of multiple media processors to support more conferences, at the same time significantly reducing resource fragmentation among the media processors. The voice conferencing system may enhance business communication possibilities, without significantly increasing cost or equipment requirements.

Accordingly, a voice conferencing system includes a group of media processors assigned to concurrently support a voice conference. In addition, the voice conferencing system includes distribution circuitry connected to the group of media processors. The distribution circuitry, which may be an IP router, receives data transmitted to a network distribution address, such as a multicast address, by the individual media processors. Subsequently, the distribution circuitry distributes the data received, for example, from a first media processor in the group to the remaining media processors in the group. The media processors thereby share their voice channel data with each media processor concurrently handling the voice conference.

In terms of the operation of the voice conferencing system, a first media processor receives first endpoint traffic. The first media processor then transmits a selected portion of the first endpoint traffic to the distribution circuitry for distribution to other media processors. A second media processor receives second endpoint traffic, as well as the selected portion of the first endpoint traffic. The second media processor then proceeds to determine a net traffic result from the selected portion of the first endpoint traffic, as well as the second endpoint traffic.

A media processor in the voice conferencing system includes a network interface that receives incoming voice conference traffic. The media processor also includes a processing unit that directs a selected portion of the incoming voice conference traffic through the network interface to a multicast network address.

In operation of the media processor, the media processor first receives incoming voice conference traffic. Subsequently, the media processor selects a distribution portion of the incoming voice conference traffic. One selected, the media processor may then transmit the distribution portion to a network distribution address. The media processors thereby distribute their voice channel data to each other media processor concurrently handling the voice conference.

The present invention is defined by the following claims, and nothing in this section should be taken as a limitation on those claims. Further aspects and advantages of the invention are discussed below in conjunction with the preferred embodiments. Any one or more of the above described aspects or aspects described below may be used independently or in combination with other aspects herein.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the distributed voice conferencing may be stored on or read from other machine-readable media, for example, secondary storage devices such as hard disks, floppy disks, and CD-ROMs; a signal received from a network; or other forms of ROM or RAM either currently known or later developed.

Furthermore, although specific components of the voice conferencing systems will be described, methods, systems, and articles of manufacture consistent with the voice conferencing systems may include additional or different components. For example, a processor may be implemented as a microprocessor, microcontroller, application specific integrated circuit (ASIC), discrete logic, or a combination of other types of circuits acting as explained above. Similarly, memories may be DRAM, SRAM, Flash or any other type of memory. Databases, tables, and other data structures may be separately stored and managed, incorporated into a single memory or database, or generally logically and physically organized in many different ways. The programs discussed below may be parts of a single program, separate programs, or distributed across several memories and processors.

Figure 1:
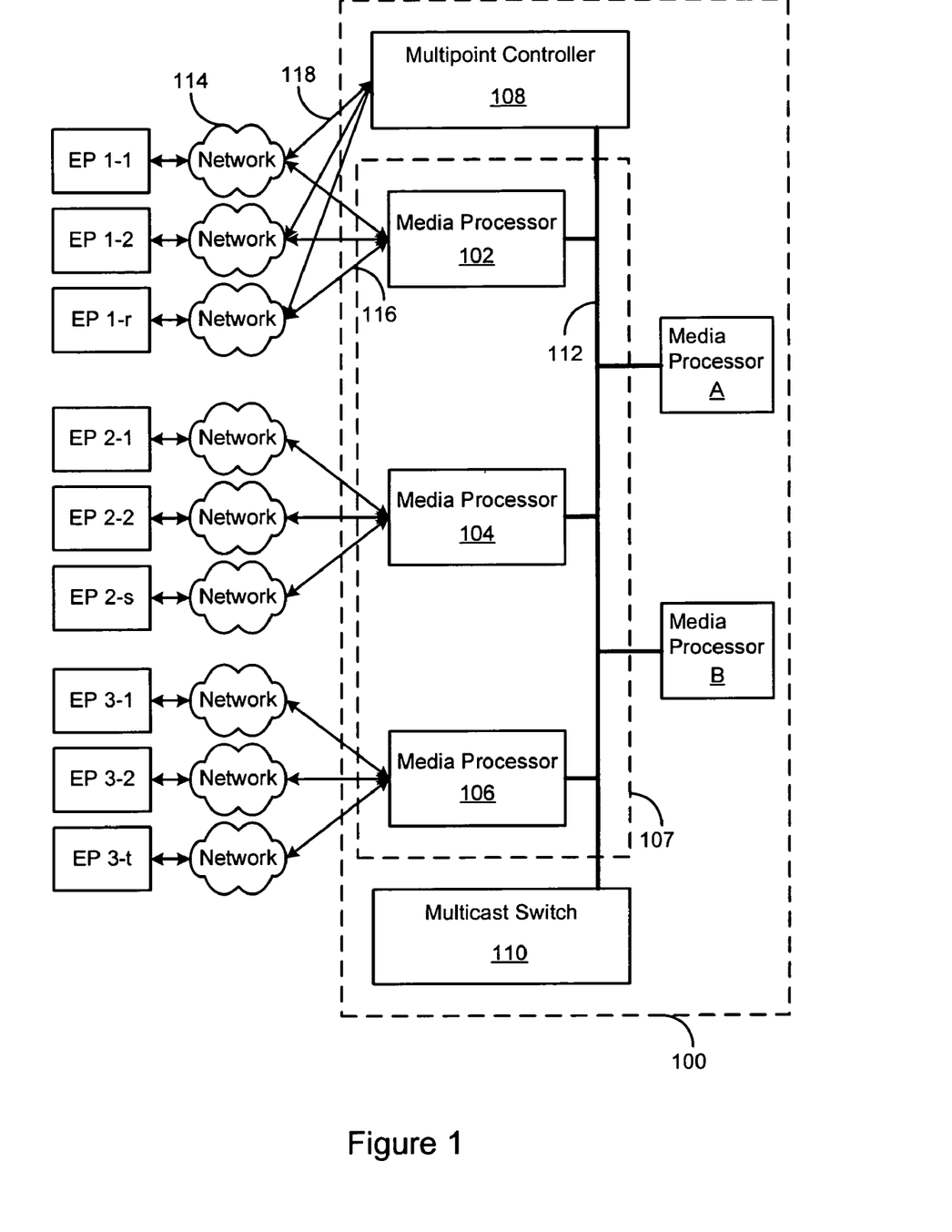
FIG. 1 illustrates one implementation of a voice conferencing system that distributes a voice conference over multiple media processors.

FIG. 1 shows a voice conferencing system 100. The conferencing system 100 includes a first media processor (MP) 102, a second MP 104, and a third MP 106. The three MPs 102-106 are part of an MP group 107. The conferencing system 100 further includes a multipoint controller (MC) 108, and a multicast switch 110. An internal network 112 connects the MPs 102-108, MC 108, and the multicast switch 110.

Each MP is assigned to handle voice conference traffic for one or more endpoints. As shown in FIG. 1, the first MP 102 handles the endpoints EP1-1 through EP1-$r$, the second MP 104 handles the endpoints EP2-1 through EP2-$s$, and the third MP 106 handles the endpoints EP3-1 through EP3-$t$. Each endpoint may communicate with the conferencing system 100 through an external network, for example, the external network 114. The endpoint may then communicate with the media processor through an MP connection, for example the MP connection 116, and with the multipoint controller 108 through an MC connection, for example, the MC connection 118. Either of the MP connection 116 and the MC connection 118 may include a network address, network address and port number, or another type of network identifying information.

Although FIG. 1 shows three MPs 102-106, the conferencing system 100 may include more or fewer MPs. Accordingly, additional MPs may be added to expand the overall voice conferencing capabilities of the conferencing system 100. For example, as shown in FIG. 1, the MP A and MP B are present and part of the conferencing system 100, and stand ready to support an ongoing voice conference or a new voice conference. As will be explained in more detail below, the MC 108 distributes a voice conference over multiple MPs.

To that end, the MC 108 communicates with the MPs 102-106 over the internal network 112. The networks 112, 114 may adhere to one or more network topologies and technologies. For example, the networks 112, 114 may be an Ethernet network, but in other implementations may alternatively be implemented as a Fiber Distributed Data Interconnect (FDDI) network, Copper Distributed Data Interface (CDDI) network, or another network technology.

In one implementation, the networks 112, 114 are IP packet switched networks, employing addressed packet communication. For example, the networks 112, 114 may support transmission and reception of User Datagram Protocol (UDP) packets for communication between the MC 108, MPs 102-106, endpoints, and the switch 110. Other packet types may be employed however, depending on the desired underlying network implementation.

The MC 108 tracks the resource availability at each MP 102-106. For example, the MC 108 may monitor the estimated remaining voice channel capacity at each MP 102-106. The MC may then distribute endpoints in a voice conference among the MPs 102-106 in order to support a voice conference that is otherwise too large for any single MP to currently handle.

The endpoints represent any participant in the voice conference. An endpoint is not limited to a human speaker sitting at a desk or in a conference room, however. Rather, the endpoint may represent any connection to the voice conference, including those that are automatic or mechanical in nature. For example, an endpoint may be a computer system converting speech signals to text data for later retrieval.

Each endpoint communicates with the conferencing system 100 through a network, such as the external network 114. The networks generally represents a transport mechanism or interconnection of multiple transport mechanisms for voice conference traffic to and from the endpoint. As one example, the endpoint may be a home personal computer communicating over a dial-up modem, DSL, T1, or other network connection to the conferencing system 100.

A conference participant at home or in an office may, for example, employ their personal computer, telephone set, or another input device, to digitize voice data received through a microphone, encode the voice data, and transmit the voice data through the external network 114 to the conferencing system 100. Similarly, the home or office computer may receive voice conference traffic through the external network 114, decode the voice data in the conference traffic, and reproduce the voice data using a sound card and speakers attached to the personal computer. Each endpoint may be assigned a network address that serves to identify the endpoint. The network address may include an IP address, for example, or an IP address and a port number. As indicated above, however, alternative addressing techniques may additionally or alternatively be employed to identify the endpoints.

Any endpoint may employ multiple connections to the conferencing system 100. Consequently, an endpoint may directly communicate with the MPs 102-106 through MP connections, and also directly communicate with the MC 108 through an MC connection. To that end, each MP 102-106 and the MC 108 may include one or more dedicated network addresses and port numbers that identify the MPs 102-106 and MC 108. As examples, the network addresses may be class A, B, C, D, or E IP addresses. However, the network addresses may adhere to other network address standards, such as the IP v 6 standard, or another network address standard. In other implementations, a single connection is provided between an endpoint and the system 100.

In one implementation, the conferencing system 100 transmits and receives voice conference traffic using a high speed protocol. For example, the conferencing system 100 may employ the Real Time Protocol (RTP) over UDP to provide a responsive voice conference experience for the endpoints. In addition, the signaling between the conferencing system 100 and the endpoints may proceed according to the H.323 packet-based multimedia communications system standard published by the International Telecommunications Union (ITU). In other implementations, however, the conferencing system 100 may employ additional or alternative protocols selected according to any desired network implementation specifications. For example, the conferencing system 100 and endpoints may employ the Session Initiation Protocol (SIP) developed for Internet conferencing, telephony, presence, events notification and instant messaging.

The conferencing system 100 may packetize voice conference data sent to any endpoint, or receive packetized voice conference data from any endpoint. As one example, the conferencing system 100 may distribute outgoing voice conference data into packets that contain approximately 30 ms of voice data. Similarly, the voice conferencing system 100 receive and buffer incoming voice conference data distributed among packets holding approximately 30 ms of voice data. In other implementations, however, more or less than 30 ms of voice data may be stored in each packet.

As shown in FIG. 1, a voice conference is in place, distributed between the three MPs 102-106 in the MP group 107. The first MP 102 processes the voice conference traffic for the 'r' endpoints EP1-1 through EP1-r. The second MP 104 processes the voice conference traffic for 's' endpoints EP2-1 through EP2-s. Similarly, the third MP 106 processes the voice conference traffic for 't' endpoints EP3-1 through EP3-t. Accordingly, the three MPs 102-106 support a voice conference with 'm'='r'+'s'+'t' total voice channels. A voice conference may expand or contract during its existence as new endpoints join the conference, or as existing endpoints leave the conference. Consequently, the total number of endpoints may vary extensively during a voice conference. Furthermore, any MP 102-106 may belong to one or more MP groups, depending on the distribution of voice conferences between the MPs 102-106.

Figure 2:
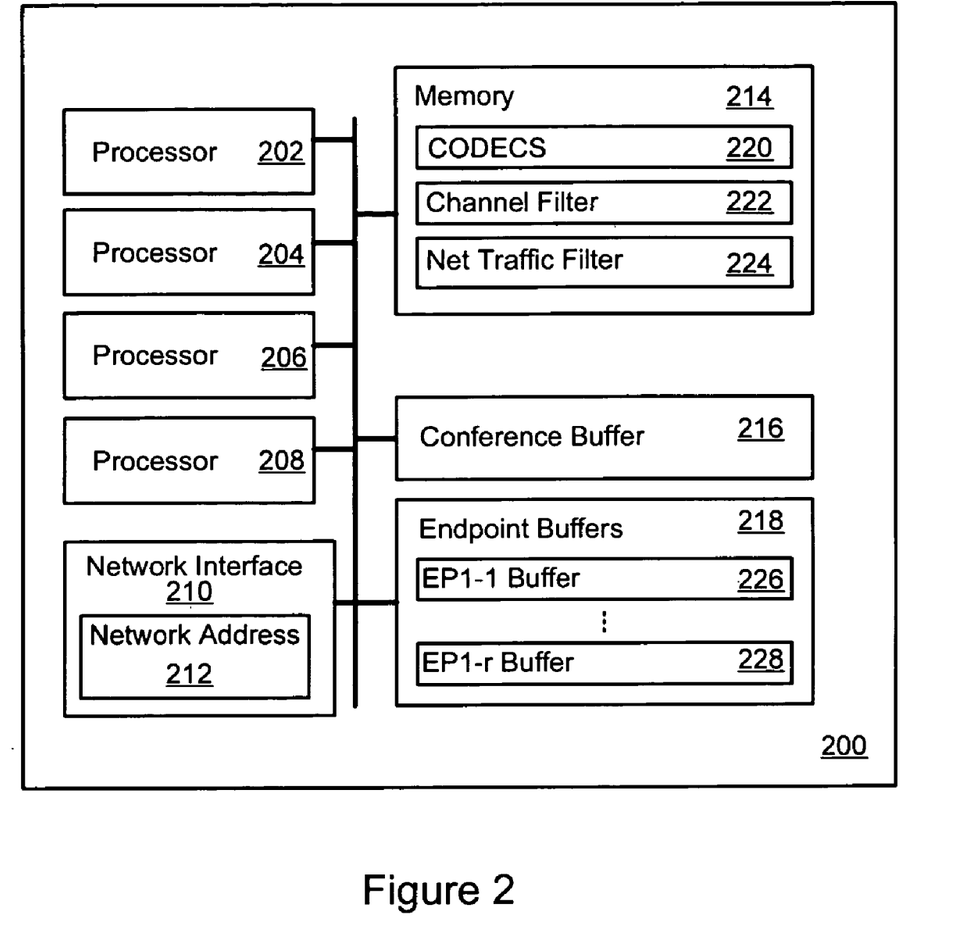
FIG. 2 illustrates one implementation of a media processor that may be employed in the voice conferencing system shown in FIG. 1.

FIG. 2 shows one implementation of a media processor 200. The media processor 200 may be implemented as a stand alone processing system, for example, or may be integrated with other processing systems present in the conferencing system 100. Each media processor in the conferencing system 100 may be implemented in the same or in a different manner than that discussed below with regard to FIG. 2.

The media processor 200 includes one or more central processing units, for example, the CPUs 202, 204, 206, and 208, a network interface 210, and a network address 212 assigned to the network interface 210. In addition, the media processor 200 includes a memory 214 that may store programs or data, a conference buffer 216, and an endpoint buffer 218. The program memory may include, as examples, voice Coders/Decoders (CODECs) 220, a channel filter 222, and a net traffic filter 224. The endpoint buffer 218 is physically or logically allocated into individual buffers for each endpoint handled by the media processor 200. FIG. 2 shows the EP1-1 buffer 226 and the EP1-r buffer 228 as examples.

In operation, the network interface 210 receives voice conference traffic from the endpoints. The voice conference traffic is typically encoded digitized voice samples, transmitted in UDP packets forming a voice channel to the media processor 200. A voice channel is the data flow supported by a transport mechanism between an endpoint and the media processor 200. The voice channels are implemented, for example, through unidirectional or bi-directional IP packet transmission of voice conference data from any endpoint to the media processor 200 and from the media processor 200 to the endpoint.

The media processor 200 stores incoming voice conference traffic from a given endpoint in an associated endpoint buffer. In one implementation, the endpoint buffers 218 store approximately 1-2 packets or 20-50 ms of voice conference traffic, and thereby help reduce the undesirable effects of network jitter on the voice conference. The individual buffers may be enlarged or reduced however, to accommodate more or less network jitter, or to meet other implementation specifications.

As voice conference traffic arrives, the media processor 200 distributes the processing load among the data processors 202-208. The data processors 202-208 retrieve voice conference traffic from the endpoint buffers 218, and decode the voice channels in the voice conference traffic. The data processors 202-208 may apply the channel data in the voice conference traffic to the CODECs 220 to recover the digitized voice samples in each voice channel.

As the data processors 202-208 decode the voice channels, the data processors 202-208 prepare to distribute a selected portion of the voice channels to the other media processors 102-106 in the conferencing system 100. In one implementation, the media processors 102-106 apply the channel filter 222 to the voice channels in order to determine the portion of the voice channels to transmit to the other media processors 102-106.

As one example, the channel filter 222 may be an n-loudest analysis program that analyzes the decoded voice channel data to determine the 'n' loudest voice channels among the voice channels. Alternatively, the channel filter 222 may be a hardware circuit that performs the same or a different filtering function. The channel filter 222 is not limited to an 'n' loudest filter, however. Instead, the channel filter 222 (whether implemented in hardware or software) may instead select any set of the incoming voice channels as the portion of the voice channels for distribution according to any other desired criteria. For example, the channel filter 222 may select all incoming channels, already mixed, for distribution.

Once determined, the media processor 200 transmits the voice channel data in the selected voice channels to each of the remaining media processors in the MP group 107 that is concurrently supporting the voice conference. Accordingly, the media processor 200 may packetize and transmit the selected voice channels to the multicast switch 110. When UDP packets are employed, for example, the media processor 200 may transmit the selected voice channels to a UDP multicast address that incorporates the group address or identifier.

In turn, the multicast switch 110 receives the voice channel data from the selected voice channels, and transmits the channel data to other media processors, for example, each remaining media processor. In that regard, the multicast switch 110 may determine the assigned network addresses for each remaining media processor by consulting an internal routing table. As a result, each media processor concurrently supporting a voice conference receives selected voice channels from each remaining media processor also supporting the same voice conference.

The multicast switch 110 is one example of distribution circuitry that may forward the voice channel data to each MP. Other distribution circuitry may also be employed, however. As examples, the distribution circuitry may instead be a network hub or other network device that forwards packets to multiple destinations in a broadcast, multicast, or direct communication manner. Alternatively, the media processor may consult a routing table and route the channel data to other media processors without the multicast switch 110.

With reference again to FIG. 1, and assuming, for example, that each MP 102-106 employs an 'n' loudest channel filter 222, then the MP 102 forwards the channel data for the 'n' loudest voice channels of the voice conference traffic from EP1-1 through EP1-r to both the MP 104 and MP 106. Similarly, the MP 104 forwards the channel data for the 'n' loudest voice channels of the voice conference traffic from EP2-1 through EP2-s to both the MP 102 and MP 106. In addition, the MP 106 forwards the channel data for the 'n' loudest voice channels of the voice conference traffic from EP3-1 through EP3-s to both the MP 102 and the MP 104. The conference buffer 216 in each MP may store the received voice channels for processing by the data processors 202-208.

Each MP 102-106 therefore receives voice channel data for 'n' selected voice channels from each other MP in the MP group 107. Accordingly, each MP 102-106 obtains 3n sets of voice channel data that are the loudest among all the conference endpoints. In one implementation, the MPs 102-106 individually apply a net traffic filter 224 to the obtained 3n voice channels to determine a net traffic result to be sent back to each endpoint handled by that MP.

As one example, the net traffic filter may also be an 'n' loudest analysis program. In that case, the net traffic filter 224 in each MP 102-106 identifies the 'n' loudest voice channels from among the 3n loudest voice channels. In other implementations, however, the net traffic filter may apply different filtering criteria to the received voice channel data to select any subset of the received voice channels as the net traffic result. Furthermore, the application of the channel filter 222 is optional, and an MP may therefore instead send back all of the voice channels received from the remaining MN in the MP group 107. In other words, the net traffic result may be the sum of all the selected voice channels obtained from each MP in the MP group 107.

Once the MP 102, for example, has determined the net traffic result, the MP 102 may then apply one or more CODECs 220 to individually encode the voice channels for delivery to the endpoints EP1-1 through EP1-r. Once encoded, the MP 102 delivers the net traffic result to each endpoint through the network interface 210. In that regard, the MP 102 may transmit the net traffic result via RTP over UDP to each endpoint.

As a result, the voice conference is distributed over multiple media processors 102-106. By employing the multicast switch 110, only a single transmission delay 'X' is incurred for communication between all the MPs in a MP group. Assuming each MP takes 'Y' time to process the voice conference traffic, then the total delay for distributed voice conferencing is only X+Y. Because X and Y may each be under 20 ms, the total delay may be under 40 ms.

The delay 'X' is independent of the number of media processors in an MP group. As a result, even when additional MPs are added to support an ongoing voice conference, the total delay remains X+Y. A voice conference may dynamically grow or shrink without adverse delay impacts on the conference participants.

The voice conferencing system 100 decentralizes voice conference processing from a single MP to multiple MPs in an MP group. Nevertheless, the MP group may physically reside at a centralized location and remain part of a centralized voice conferencing system. The voice conferencing system 100 may thereby represent a centralized conferencing approach with internal decentralization.

Although the voice conferencing system 100 may be decentralized, the delay 'X' does not increase as the conferencing system 100 distributes a voice conference over multiple MPs. Accordingly, whether a voice conference starts in a distributed manner over multiple MPs, or grows to span multiple MPs, the conference participants do not experience reduced voice conference quality from decentralization. Instead, the participants may encounter a consistent voice conference experience, even as the conference grows or shrinks across more or fewer MPs.

While multicasting the voice channel data between media processors has certain advantages, it is not the only way to distribute the voice channel data. Rather, the media processors may employ any desired communication mechanism for sharing their selected voice channels between the remaining media processors. For example, the media processors may sequentially transfer voice channel data through direct communication with each media processor.

Figure 3:
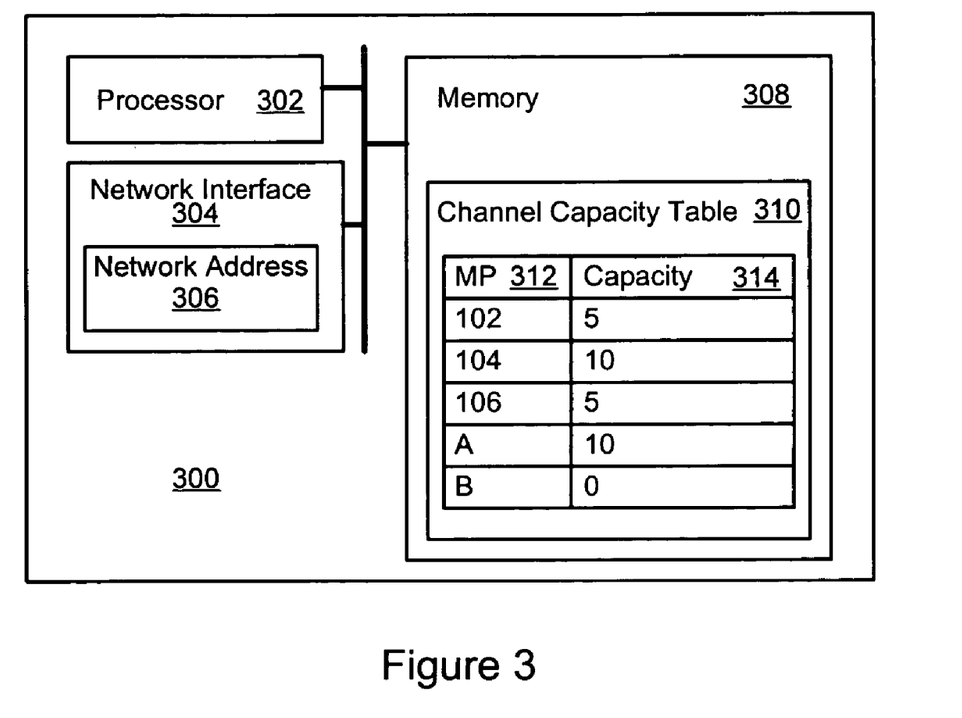
FIG. 3 illustrates one implementation of a multipoint controller that may be employed in the voice conferencing system shown in FIG. 1.

FIG. 3 illustrates a multipoint controller (MC) 300 that may be employed in the conferencing system 100. The MC 300 includes a processor 302, a network interface 304, and a network address 306 assigned to the MC 300. A memory 308 in the MC 300 includes a channel capacity table 310. The channel capacity table 310 includes a media processor field 312 and an estimated remaining channel capacity field 314.

In the example shown in FIG. 3, the channel capacity table 310 includes a media processor field entry for each of the MPs 102-106, and well as for a fourth MP labeled B. Associated with each media processor field entry is an estimated remaining channel capacity. As shown, the MP 102 has the capability to handle 5 additional voice channels, the MP 104 has the capability to handle 10 additional voice channels, and the MP 106 has the capability to handle 5 additional voice channels. The MP A in the voice conferencing system 100 has the capacity to handle 10 additional voice channels, while MP B has no remaining capacity.

The MC 300 maintains the channel capacity table 310 through, for example, periodic communication with the media processors in a conferencing system. Thus, the media processors may report their estimated remaining channel capacity to the MC 300 at selected times, intervals, or periods. Additionally or alternatively, the MC 300 may be pre-configured with the total estimate channel capacity of each media processor, and may then maintain the channel capacity table 310 based on assignments and releases of endpoints to and from media processors as explained below. Additionally or alternatively, the MC 300 may track channel capacity at each MP in other ways or using a different table structure or data structure.

The endpoints may communicate directly (or indirectly via a media processor) with the MC 300 through the network interface 304. As examples, the endpoints may request to join a voice conference, or inform the MC 300 that the endpoint is leaving an existing voice conference through an MC connection 118. In response, the MC 300 determines which media processor to assign to the voice conference, in keeping with the estimated channel capacities available at each media processor.

The MC 300 may allocate the endpoints to the media processors in many different ways. For example, assuming that the MC 300 will setup a new voice conference with 20 voice channels, there is no single MP that can handle the voice conference. Without distributing the new voice conference among the existing MPs, the total unused channel capacity of 30 voice channels would be wasted. However, the distributed conferencing system 100, through the communication techniques described above, treats all the available voice channel capacity among disparate media processors as a single logical pool of voice channel resources.

Consequently, the MC 300 selects two or more media processors to concurrently handle the new voice conference. For example, the MC 300 may select the fewest number of media processors needed to handle the new voice conference. In that case, the MC 300 would select the MP 104 and the MP A to handle the new voice conference. The MP 104 and the MP A may then form a second MP group with its own unique identifier that may be used as part of a UDP multicast address for the second MP group. As other examples, the MC 300 may select the greatest number of media processors needed to handle the new voice conference, the fastest media processors, sequentially pick media processors from the channel capacity table 310, randomly pick media processors form the channel capacity table 210, or choose media processors according to any other selection technique.

After determining which media processors will handle the new voice conference, the MC 300 updates the channel capacity table 310. The MC 300 then communicates voice conference setup information over the network 112 to each selected media processor. As examples, the setup information may include the number of voice channels that the media processor will need to support for the new voice conference, the network addresses of the endpoints that the media processor will support, the group identifier that may form part of the multicast address for the media processors handling the new voice conference, the appropriate CODEC to apply for the endpoint, and the like.

Once the voice conference is established, the media processors directly handle incoming and outgoing voice conference traffic with their assigned endpoints. As new endpoints request to join a voice conference, the MC 300 may again consult the channel capacity table 310 to determine which media processor will support the new endpoint. The MC 300 responsively updates the channel capacity table 310 and communicates the setup information to the media processor. Similarly, as endpoints inform the MC 300 that they are dropping from the voice conference, as drops are detected or as the media processors report dropped endpoints, the MC 300 updates the channel capacity table 310.

Figure 4:
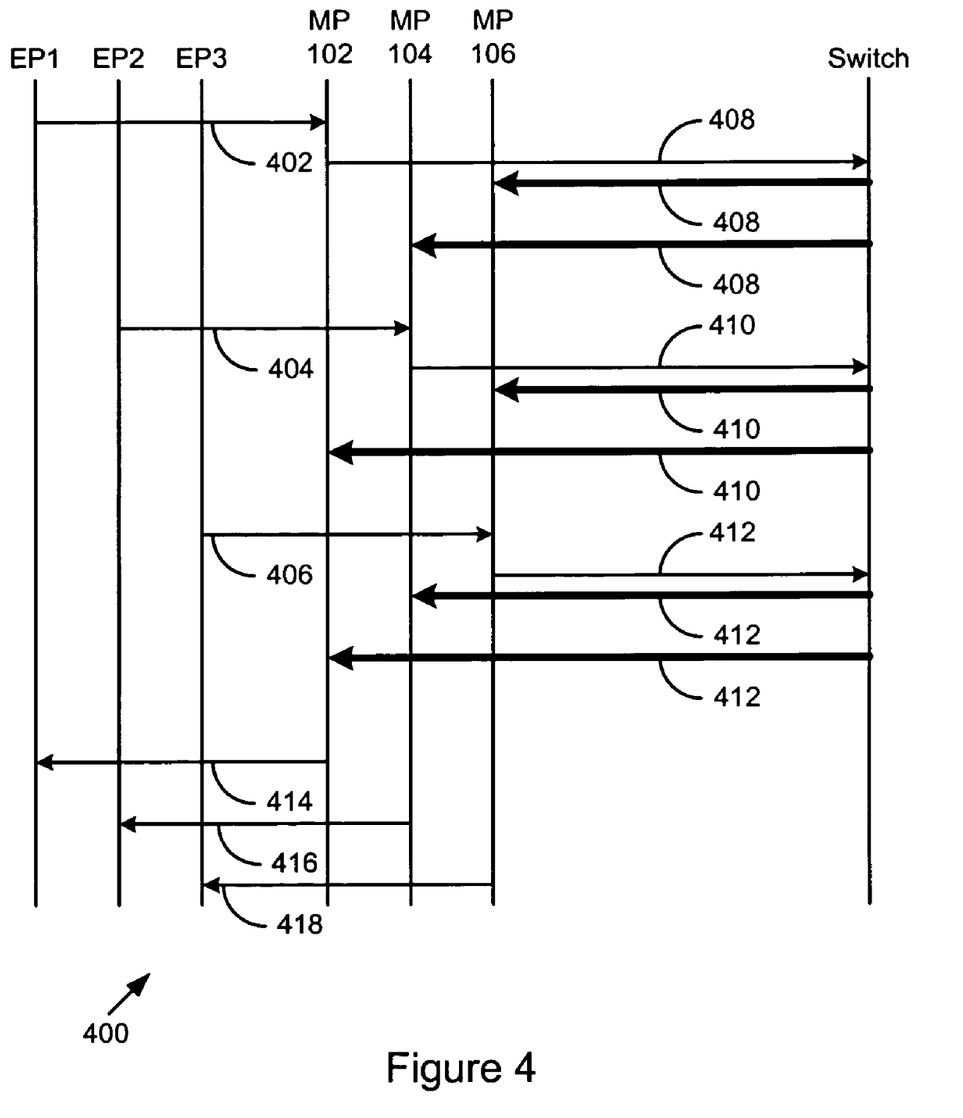
FIG. 4 shows one example of a signal flow diagram of voice conference traffic between the media processors, the multicast switch, and the endpoints in the voice conferencing system shown in FIG. 1.

FIG. 4 shows a signal flow diagram 400 that traces incoming and outgoing voice conference traffic through the voice conferencing system 100. In FIG. 4, EP1 represents the endpoints EP1-1 through EP1-r, EP2 represents the endpoints EP2-1 through EP2-s, and EP3 represents the endpoints EP3-1 through EP3-t. Incoming voice conference traffic 402 arrives at the MP 102 from EP1. Similarly, incoming voice conference traffic 404 and 406 arrives at the MPs 104 and 106, respectively.

Each MP 102-106 applies a channel filter to its incoming voice conference traffic. As a result, the MP 102 transmits selected voice channels 408 originating with EP1 to the multicast address, and thereby to the multicast switch 110. For example, the MP 102 may transmit the 'n' loudest voice channels to the multicast switch 110. In addition, the MP 104 applies its channel filter, selects one or more of its incoming voice channels to transmit to the multicast address, and transmits the selected voice channels 410 to the multicast switch 110. Selected voice channels 412 determined by the MP 106 also arrive at the multicast switch 110.

The multicast switch 110 receives the selected voice channels 408-412 from each MP 102-106. Because the UDP packets specify a MP group address, the multicast switch 110 may consult an internal routing table to determine the assigned network addresses for the MPs in the corresponding MP group 107. The multicast switch 110 then proceeds to forward the selected voice channels form each MP every other MP in the MP group 107.

More specifically, the multicast switch 110 forwards the selected voice channels 408 from MP 102 to the MP 104 and the MP 106. Similarly, the multicast switch 110 forwards the selected voice channels 410 from MP 104 to the MP 102 and the MP 106. The selected voice channels 412 from MP 106 arrive, through multicast transmission, at the MP 102 and the MP 104, as shown in FIG. 4.

Each MP 102-106 independently determines a net traffic result from all of the voice channel data received from other MPs in the MP group 107. As an example, each MP 102-106 may determine the 'n' loudest voice channels present at any given time among all the endpoints EP1-3. Subsequently, each MP 102-106 communicates the net traffic result to the endpoints assigned to that MP.

FIG. 4 shows that the MP 102 transmits a net traffic result as outgoing voice conference traffic 414 to the EP 1. In addition, the MP 104 transmits a net traffic result as outgoing voice conference traffic 416 to the EP2. In the same manner, the MP 106 determines a net traffic result, and transmits it as the outgoing voice conference traffic 418 to the EP3.

Figure 5:
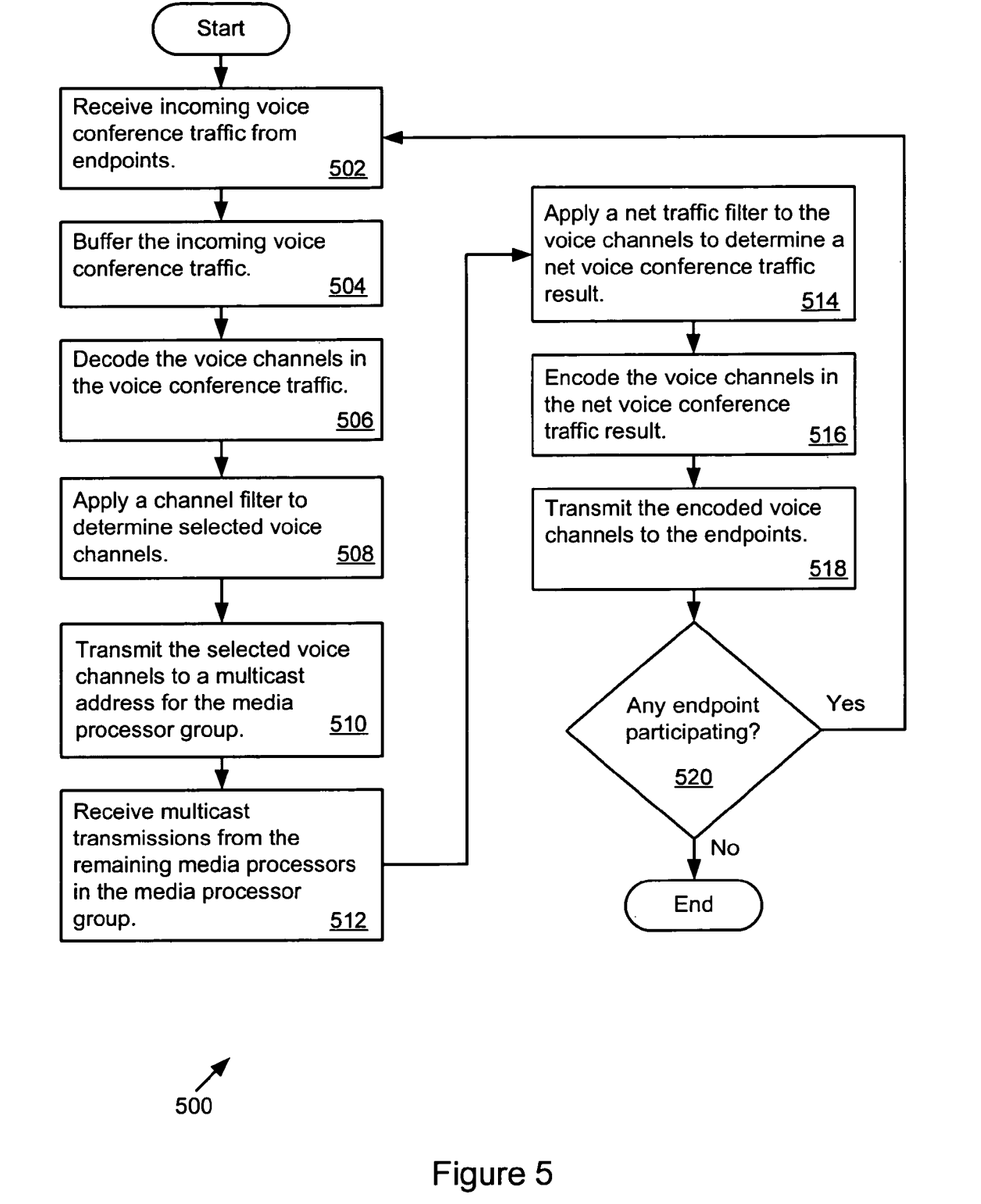
FIG. 5 illustrates one example of a flow diagram of the acts that a media processor may take to distribute selected incoming voice conference data to other media processors in the voice conferencing system shown in FIG. 1.

FIG. 5 shows a flow diagram 500 of the acts taken by a media processor 102-106 in the distributed voice conferencing system 100. For example, the media processor 102 may first receive incoming voice conference traffic 402 from the endpoints EP1-1 through EP1-r (Act 502). The endpoint buffers 218 temporarily store the incoming voice conference traffic 402 (Act 504). Once the incoming voice conference traffic 402 has arrived, the media processor 102 may then apply one or more CODECs 220 to the voice channels in the voice conference traffic 402 to decode the digitized data samples (Act 506).

With or without the voice channels decoded, the media processor 102 may apply a channel filter 222 to determine one or more voice channels in the incoming voice conference traffic to forward to other media processors (Act 508). For example, the media processor 102 may apply an n-loudest channel filter to select fewer than all voice channels from the incoming voice conference traffic. The selected voice channels are then transmitted to the remaining media processors in the media processor group 107 (Act 510). To that end, the media processor 102 may transmit the selected voice channels in UDP packets to a UDP multicast address including a group identifier for the media processor group 107.

The multicast switch 110 receives the selected voice channels on the multicast address. In response, the multicast switch 110 determines the assigned network addresses for each remaining media processor in the processor group 107. The multicast switch 110 then transmits the selected voice channels to each of the remaining media processors 104, 106. Each remaining media processor 104, 106 performs the same processing steps on incoming voice conference traffic 404, 406.

Accordingly, the media processor 102 receives multicast transmissions of voice channel data originating with the media processors 104 and 106 (Act 512). In order to determine which voice channels to forward to the endpoints EP1-1 through EP1-r, the media processor 102 applies a net traffic filter to the voice channel data received in addition to its own voice channel data (Act 514). Thus, for example, although the media processor 102 may obtain 3n loudest voice channels, the media processor 102 selects, for example, 'n' loudest of the 3n loudest voice channels as the net traffic result. The media processor 102 thereby may keep the conference participants from becoming overwhelmed with information.

Having determined the net traffic result, the media processor 102 mixes each channel in the net traffic result into an output stream. The media processor 102 may then apply one or more of the CODECs 220 to the output stream. The media processor 102 thereby encodes the net traffic result for each endpoint according to the CODEC previously negotiated for that endpoint (Act 516). The media processor 102 may then forward the net traffic result in the form of encoded output streams to its endpoints EP1-1 through EP1-r (Act 518). The media processor 102 determines whether any endpoints are still participating in the voice conference (Act 520). If so, processing continues as noted above. Otherwise, the media processor 102 may terminate processing.

The distributed conferencing system 100 assigns a single voice conference over multiple media processors. As a result, the conferencing system 100 is not limited to running any given voice conference on a single media processor. Even though each media processor has a finite channel capacity, the conferencing system 100 may allow additional voice conferences to proceed by pooling resources from multiple media processors. As an additional benefit, the conferencing system 100 may experience less resource fragmentation than prior systems. In other words, the conferencing system 100 may more efficiently employ the hardware already present in the conferencing system 100 to support more voice conferences than would be possible otherwise.

It is therefore intended that the foregoing detailed description be regarded as illustrative rather than limiting, and that it be understood that it is the following claims, including all equivalents, that are intended to define the spirit and scope of this invention.

What is claimed is:

1. A Media processor for a voice conferencing system, the media processor comprising:
    a network interface configured to receive from endpoints incoming voice conference traffic representing a first portion of a voice conference; and
    a processor configured to:
    transmit the first portion through the network interface to a multicast distribution address of a distribution device operable to multicast the first portion to at least a second media processor assigned to process a different portion of the voice conference;
    receive the different portion after multicast of the different portion by the distribution device to the network interface; and
    forward the different portion to the endpoints.

2. The media processor of claim 1, where the incoming voice conference traffic comprises voice channels, and further comprising a n-loudest channel filter that determines the selected portion as up to 'n' loudest of the voice channels.

3. The media processor of claim 1, where the network interface listens on an assigned network address to receive the different portion from the second media processor.

4. The media processor of claim 3, where the processor determines a net voice conference traffic results of no more than 'n' loudest voice channels from the first portion of the incoming voice conference traffic and the different portion from the second media processor.

5. The media processor of claim 1, where the processor breaks the first portion into packets prior to transmission through the network interface.

6. The media processor of claim 5, where the packets are User Datagram Protocol (UDP) packets.

7. The media processor of claim 3, further comprising a multicast buffer for storing at least a portion of the different portion.

8. A voice conferencing system comprising:
    a group of media processors assigned to concurrently support a voice conference, each media processor in the group of media processors assigned to different voice channels in the voice conference; and
    distribution circuitry coupled to the group of media processors, the distribution circuitry operable to communicate selected voice conference data received from a first media processor in the group to remaining media processors in the group.

9. The voice conferencing system of claim 8, where the distribution circuitry comprises a multicast switch operable to communicate the selected voice conference data received from the first media processor in the group to remaining media processors in the group.

10. The voice conferencing system of claim 8, where the distribution circuitry communicates the selected voice conference data to a network distribution address.

11. The voice conferencing system of claim 10, where the network distribution address is a User Datagram Protocol (UDP) multicast address.

12. The voice conferencing system of claim 8, where the first media processor comprises a first network interface that receives incoming voice conference traffic, and a traffic filter that determines the selected voice conference data from the incoming voice conference traffic.

13. The voice conferencing system of claim 12, where the traffic filter is an n-loudest voice channel filter for the different voice channels.

14. The voice conferencing system of claim 8, where the first media processor is operable to receive a selected transmission of voice conference traffic originating from at least one other media processor in the group.

15. The voice conferencing system of claim 14, where the first media processor determines a net voice conference traffic result of no more that 'n' loudest voice channels from the selected voice conference data and the selected transmission.

16. A method for exchanging voice conference data, the method comprising:
    receiving from endpoints incoming voice conference traffic representing a first portion of a voice conference at a first media processor;
    transmitting the first portion to a distribution device operable to multicast the first portion to at least a second media processor assigned to process a different portion of the voice conference that the first portion; and
    receiving the different portion at the first processor after multicast of the different portion by the distribution device.

17. The method of claim 16, where transmitting comprises transmitting to a UDP multicast address.

18. The method of claim 16, where the incoming voice conference traffic comprises voice channels, and further comprising selecting fewer than all the voice channels in the incoming voice conference traffic as the first portion.

19. The method of claim 16, where transmitting comprises multicasting.

20. The method of claim 19, further comprising determining a net voice conference traffic result from the first portion of the incoming voice conference traffic and the different portion from the second media processor.

21. A method for conducting a voice conference comprising:
    receiving first endpoint traffic at a first media processor;

transmitting from the first media processor a selected portion of the first endpoint traffic;
receiving second endpoint traffic at a second media processor;
distributing the selected portion to the second media processor; and
receiving the selected portion at the second media processor.

22. The method of claim 21, further comprising determining, at the second media processor, a second endpoint net traffic result from the selected portion and the second endpoint traffic.

23. The method of claim 22, where determining a second endpoint net traffic result comprises selecting fewer than all voice channels present in the selected portion and in the second endpoint traffic.

24. The method of claim 21, further comprising:
transmitting from the second media processor a selected portion of the second endpoint traffic to distribution circuitry;
distributing the selected portion of the second endpoint traffic to a media processor group including the first media processor;
receiving the selected portion of the second endpoint traffic at the first media processor; and
determining at the first media processor a first endpoint net traffic result from the selected portions of the endpoint traffic.

25. The method of claim 21, where distributing comprises transmitting to a multicast address.

26. A non-transitory machine readable medium, the non-transitory machine readable medium having code stored therein, the code having instructions which, when executed, cause a computer apparatus to perform a method, the method comprising:
receiving instructions that receive, from endpoints, incoming voice conference traffic representing a first portion of a voice conference at a first media processor;
transmitting instructions that transmit the first portion to a distribution device operable to multicast the first portion to at least a second media processor assigned to process a different portion of the voice conference than the first portion; and
receiving instructions that receive the different portion at the first processor after the multicast of the different portion by the distribution device.

27. The machine readable medium of claim 26, where the transmitting instructions execute transmitting portion to a media processor group distribution address that is a multicast address.

28. The machine readable medium of claim 26, further comprising filtering instructions that filter the incoming voice conference traffic to obtain the first portion.

29. The machine readable medium of claim 26, further comprising receiving instructions that receive a distribution transmission of voice conference traffic from a second media processor.

30. The machine readable medium of claim 29, further comprising determining instructions that determine a net voice conference traffic result from the first portion of the incoming voice conference traffic and the distribution transmission from the second media processor.

* * * * *